United States Patent
Egner-Walter et al.

(10) Patent No.: US 9,211,870 B2
(45) Date of Patent: Dec. 15, 2015

(54) WIPER BLADE FOR THE CLEANING OF WINDOWS OF MOTOR VEHICLES

(75) Inventors: Bruno Egner-Walter, Heilbronn (DE); Michael Schäuble, Vaihingen/Enz (DE)

(73) Assignee: Valeo Systèmes d'Essuyage, La Verriere (FR)

( * ) Notice: Subject to any disclaimer, the term of this patent is extended or adjusted under 35 U.S.C. 154(b) by 88 days.

(21) Appl. No.: 13/976,590

(22) PCT Filed: Dec. 21, 2011

(86) PCT No.: PCT/EP2011/073698
§ 371 (c)(1), (2), (4) Date: Jun. 27, 2013

(87) PCT Pub. No.: WO2012/089599
PCT Pub. Date: Jul. 5, 2012

(65) Prior Publication Data
US 2013/0269140 A1    Oct. 17, 2013

(30) Foreign Application Priority Data
Dec. 30, 2010    (DE) .......................... 10 2010 056 461

(51) Int. Cl.
*B60S 1/38* (2006.01)
*B60S 1/40* (2006.01)
*B60S 1/52* (2006.01)

(52) U.S. Cl.
CPC ............... *B60S 1/524* (2013.01); *B60S 1/3862* (2013.01); *B60S 1/4019* (2013.01); *B60S 1/407* (2013.01)

(58) Field of Classification Search
CPC ................................ B60S 1/3862; B60S 1/524
USPC .......................................... 15/250.01–250.04
See application file for complete search history.

(56) References Cited

U.S. PATENT DOCUMENTS

| | | | | |
|---|---|---|---|---|
| 5,628,085 A | * | 5/1997 | Edele et al. ................. | 15/250.32 |
| 2008/0263806 A1 | * | 10/2008 | Egner-Walter et al. .... | 15/250.01 |
| 2011/0107541 A1 | * | 5/2011 | Caillot et al. .............. | 15/250.04 |

FOREIGN PATENT DOCUMENTS

| | | |
|---|---|---|
| DE | 10 2008 049270 A1 | 4/2010 |
| EP | 1 846 275 B1 | 3/2010 |

(Continued)

OTHER PUBLICATIONS

DE102008049270 (machine translation), 2010.*

(Continued)

*Primary Examiner* — Mark Spisich
*Assistant Examiner* — Andrew A Horton
(74) *Attorney, Agent, or Firm* — Osha Liang LLP

(57) ABSTRACT

The invention relates to a wiper blade (100) for the cleaning of windows of motor vehicles, with at least one spray channel (103, 104) arranged on the wiper blade (100), with spray openings (105) for the discharging of washing fluid (5) onto the window, with at least a first connection (16; 16a; 16b) for connecting the spray channel (103, 104) to an external hose line for the supply of the washing fluid (5), and with at least one adapter (10; 10a; 10b) for connecting the wiper blade (100) to a wiper arm (2; 2a) of a wiper device (1), wherein the first connection (16; 16a; 16b) is arranged on the adapter (10; 10a; 10b), and wherein the adapter (10; 10a; 10b) is arranged hydraulically in operative connection with a second connection (22; 22a; 22b) likewise arranged on the adapter (10; 10a; 10b), which is connected with the spay channel (103, 104). According to the invention, provision is made that the adapter (10; 10a; 10b) is constructed as a single-piece plastic injection molded part.

9 Claims, 3 Drawing Sheets

(56) References Cited

FOREIGN PATENT DOCUMENTS

Figure 4:
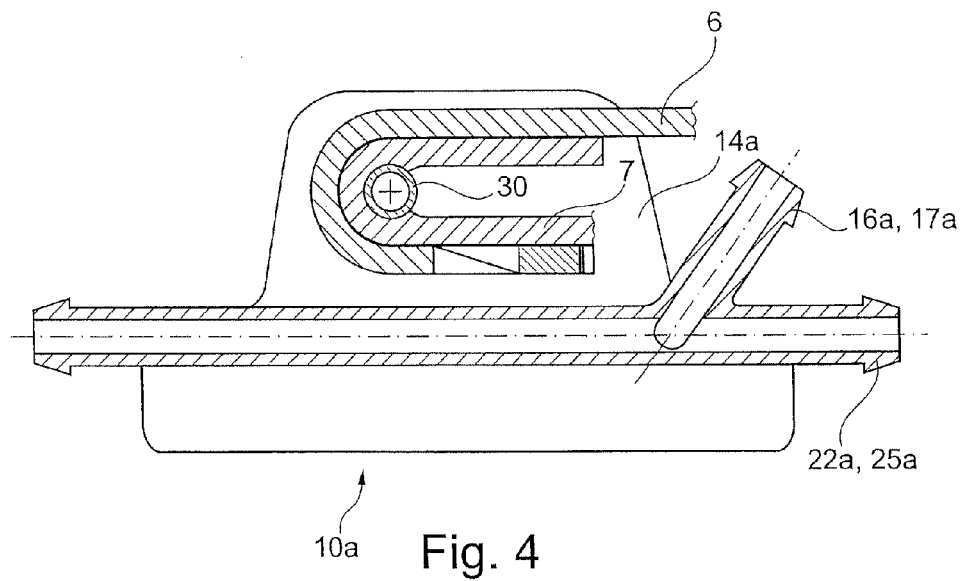

| FR | 2 920 729 A1 | 3/2009 |
| WO | 2010/006776 A1 | 1/2010 |
| WO | 2012/000972 A1 | 1/2012 |

OTHER PUBLICATIONS

FR2920729 (machine translation), 2009.*
WO2009132982 (machine translation).*
International Search Report issued in PCT/EP2011/073698 mailed on Apr. 25, 2012 (3 pages).

* cited by examiner

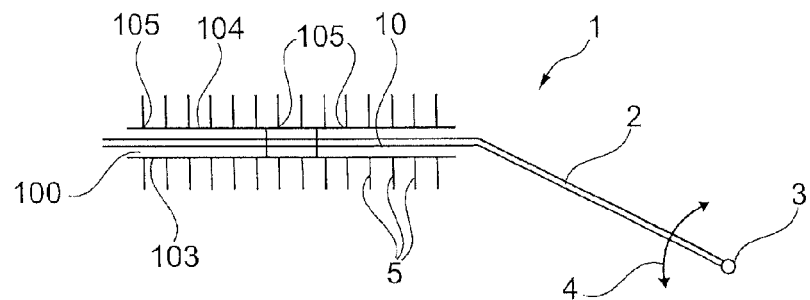
Fig. 1
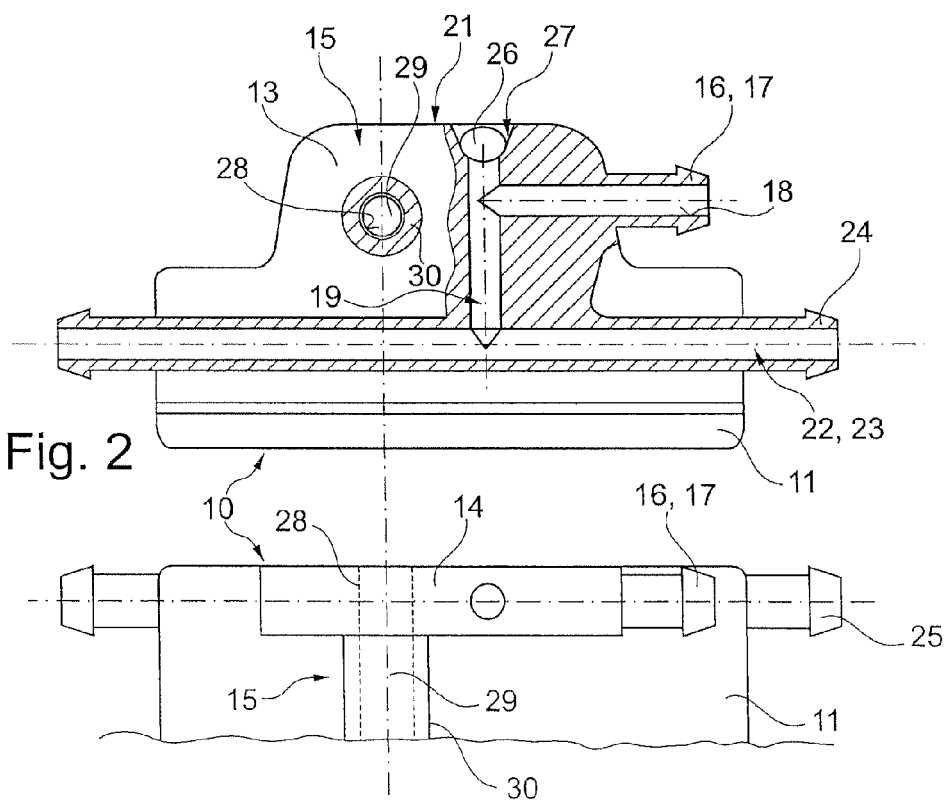
Fig. 2
Fig. 3

WIPER BLADE FOR THE CLEANING OF WINDOWS OF MOTOR VEHICLES

CROSS REFERENCE TO RELATED APPLICATIONS

This application is a 371 of PCT/EP2011/073698, filed on Dec. 21, 2011, and claims the benefit of German Patent Application No. 10 201 0 056 461.3, filed on Dec. 30, 2010.

PRIOR ART

The invention relates to a wiper blade for the cleaning of windows of motor vehicles according to the introductory clause of claim 1.

Such a wiper blade is known from EP 1 846 275 B1 of the applicant. The known wiper blade has an adapter which is connected on the one hand with the wiper arm of the wiper system, and on the other hand serves for the supplying of washing fluid to spray channels which are arranged in the wiper blade. For this, first and second connections are formed in the adapter, which with regard to the first connections are connected with a hose line for the supply of the washing fluid to the adapter and with regard to the second connections are connected with the spray channels in the wiper blade. The known adapter is constructed here as a plastic injection moulded part and consists of two parts which must be connected with each other. This takes place in practice by means of detent connections or similar. As the two parts of the adapter are only connected with each other via the detent connection, the known adapter has limits with regard to its mechanical loading capacity and the connection with the wiper arm. Furthermore, for connecting the two parts an additional mounting process is necessary, making the manufacturing costs of the wiper blade more expensive.

DISCLOSURE OF THE INVENTION

Proceeding from the represented prior art, the invention is based on the problem of further developing a wiper blade for the cleaning of windows of motor vehicles according to the introductory clause of claim 1 such that it is able to be produced particularly simply and at a favourable cost, and has particularly good mechanical characteristics. This problem is solved in a wiper blade for the cleaning of windows of motor vehicles with the features of claim 1. The invention is based here on the idea of constructing the adapter as a single-piece plastic injection moulded part. Thereby, no additional mounting steps as in the prior art are necessary. Furthermore, through the construction in a single piece, particularly good strength values or respectively mechanical characteristics are achieved, which permits structurally greater degrees of freedom.

Advantageous further developments of the wiper blade according to the invention for the cleaning of windows of motor vehicles are indicated in the sub-claims. All combinations of at least two of the features disclosed in the claims, in the description and/or in the figures fall within the scope of the invention.

In a first structural realization of the invention, which makes possible a spatial separation of the two connections at different sites of the adapter, it is proposed that the first connection is arranged on a fastening region of the adapter which runs above the second connection which is connected with the spray channel, and which serves for fastening the adapter on the wiper arm, that the second connection is constructed as a through bore in the adapter element, which is connected via two connecting pieces with two spray channels, that a connecting channel is constructed in the adapter, which connects the two connections with each other hydraulically, wherein the connecting channel opens out the one hand in the through bore of the second connection and on the other hand the first connection opens out in the through bore, and that on the side of the connecting channel facing away from the through bore, the connecting channel is sealed hydraulically by a closure member.

A hydraulic seal of the connecting channel which is particularly simple to produce and secure is achieved here when the closure member is a closure ball, which is pressed mechanically into the opening of the connecting channel arranged on the surface of the adapter.

A particularly compact construction of the fastening section of the adapter and a particularly simple producibility of the link between the two connections is achieved by dispensing with sealing bodies such as closure balls, when the first connection is constructed as a connecting piece which opens directly into the second connection. Therefore, in contrast to the solution described further above, no connecting channels are necessary, which have to be sealed due to the manufacturing technology.

An adapter of particularly compact and flat construction can be achieved here when the discharging in of the first connection takes place in a region of the second connection which is constructed as a connecting piece.

In order to be able to supply washing fluid independently of the pivot movement of the wiper arm or respectively the movement of the wiper blade respectively to the leading side of the wiper blade, furthermore a variant is particularly preferably proposed, in which the adapter has two first and second connections which are separated from each other hydraulically, and that the second connections which are connected with the spray channels are respectively constructed as through bores arranged parallel to each other, with respectively two connecting pieces for the spray channels.

In order to be able to configure the connecting region of the wiper arm in a particularly compact manner, which results in advantages with regard to aerodynamics and visual appearance, furthermore in a further embodiment of the invention it is proposed that the first connections are arranged in an intermediate space between the second connections and are connected hydraulically with the second connections via transverse channels.

Such a solution can be advantageously configured structurally by the transverse channel being closed hydraulically in a tight manner on the side facing away from the first connection by means of a closure member, or carrying preferably adjustable nozzle body which forms a spray opening for the washing fluid. Here, by means of the closure member alternatively the possibility can be created to not use a second connection for the spray channels, by the closure member being pressed far into the transverse channel such that a further connection is sealed. For the case where, however, the second connection is used, provision can be made that the closure member only closes the second channel on its surface, but the discharging in of the transverse channel into the second channel remains open. In place of the closure member there can also be a nozzle body, which has a through opening, the angle or respectively position of which is changeable, so that washing fluid emerging through the through opening can be used for cleaning the window in the region of the adapter.

The fastening of the adapter takes place in a particularly secure manner and with the possibility of covering the holding regions of the wiper arm by two holding brackets arranged parallel to each other on the sides of the adapter. Such holding brackets enable the universal use of the adapter for different adapter systems.

Thus in a first embodiment of the fastening of the adapter or respectively of the wiper blade on the wiper arm, provision is made that the wiper arm has a wiper rod with a bow-shaped connecting section, which is connected with the adapter via a bolt arranged in the two holding brackets, wherein the connecting section engages into the intermediate space between the two holding brackets.

With an alternative fastening of the wiper blade on the wiper arm, provision is made that the wiper arm of the wiper device has an adapter element which is U-shaped in cross-section, the two arms of which, which are arranged parallel to each other, overlap the two holding brackets from the exterior, wherein the adapter element is arranged pivotably to the holding brackets and is connected with the latter.

Figure 5:
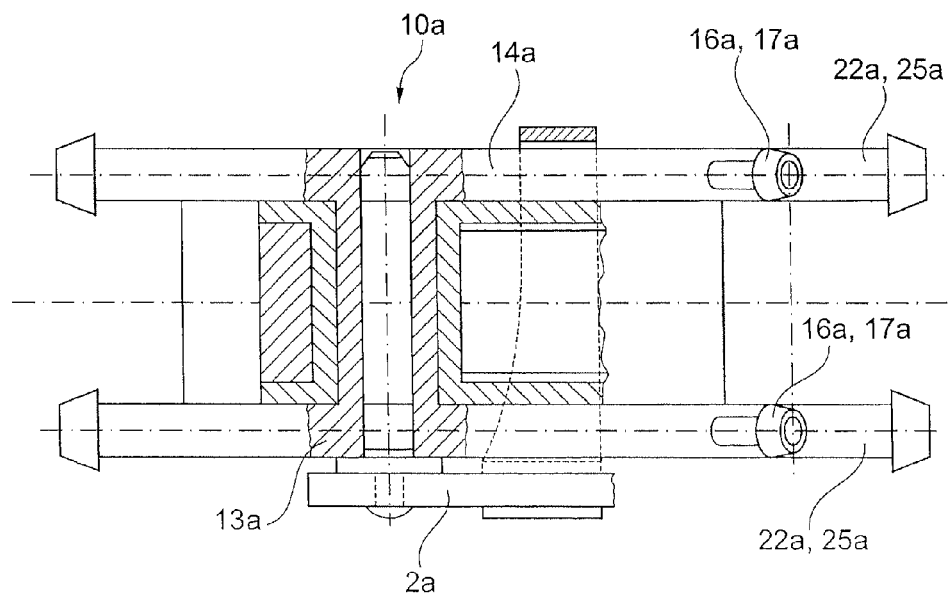
Figure 6:
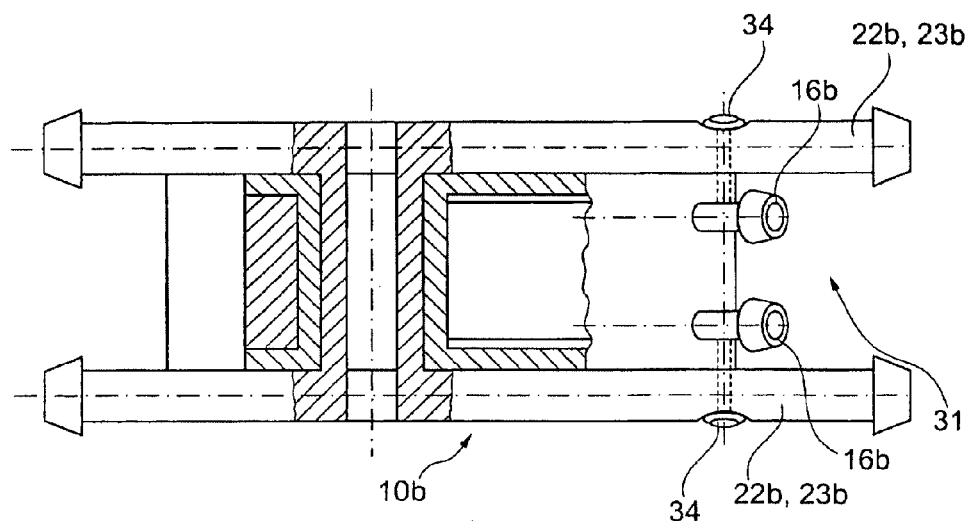
Figure 7:
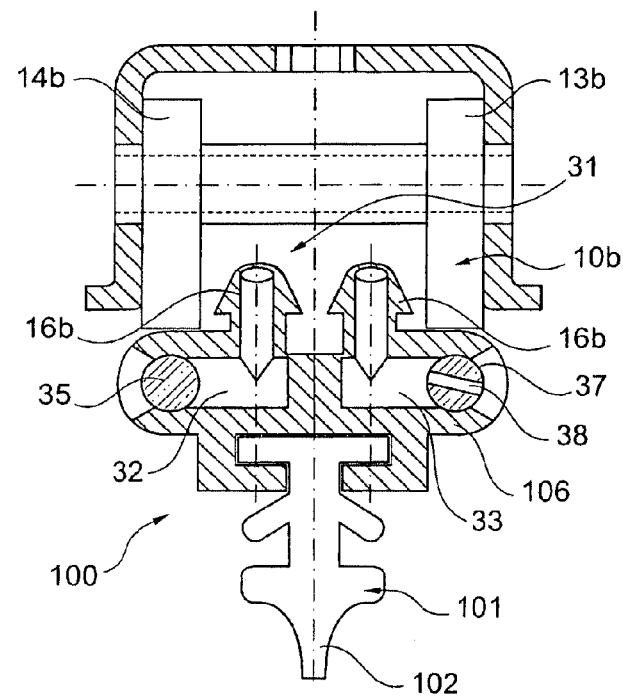

Further advantages, features and details of the invention will emerge from the following description of preferred example embodiments and with the aid of the drawings, showing in:

FIG. 1 a simplified representation of a wiper blade fastened to a wiper arm,

FIG. 2 a first adapter according to the invention in a side view partially in section, FIG. 3 the adapter according to FIG. 2 in a partial top view, FIG. 4 a second adapter according to the invention in a side view partially in section, FIG. 5 the adapter according to FIG. 4 in a top view partially in section, FIG. 6 a top view, partially in section, onto a third adapter according to the invention and FIG. 7 a cross-section through the adapter according to FIG. 6 in the region of the first connections with mounted wiper rubber.

Identical parts or respectively parts with the same function are provided with the same reference numbers in the figures.

In FIG. 1 parts of a wiper device 1 are illustrated, as serving for the cleaning of a window of a motor vehicle, which is not illustrated. The wiper device 1 has a wiper arm 2, which is pivotably mounted in an axis 3 in accordance with the double arrow 4. Here, the wiper arm 2 is driven directly via a windscreen wiper motor, which is not illustrated, or indirectly via a wiper linkage.

The wiper arm 2 is connected via an adapter 10 with a wiper blade 100. The wiper blade 100 has a wiper rubber 101 (FIG. 7), the wiper lip 102 of which is in abutting contact with the vehicle window. In addition, the wiper blade 100 has spray channels 103, 104, which run on both sides of the longitudinal extent of the wiper blade 100. Here, the spray channels 103, 104, which have nozzle openings 105 for the application of washing fluid 5 onto the vehicle window, can either be arranged or respectively constructed on separate parts of the wiper blade 100 connected with the adapter 10, or else can be an integral component of the wiper rubber 101. In the example embodiments illustrated in the figures, the spray channels 103, 104 are constructed or respectively arranged on a profile body 106 which can only be seen in FIG. 7, which in turn receives the wiper rubber 101 in a form-fitting manner. With regard to the structural configuration of such profile bodies 106 or respectively spray channels 103, 104, furthermore by way of example reference is to be made to EP 1 846 275 B1 of the applicant, which in this respect is to be a component part of this application.

The first adapter 10 illustrated in FIGS. 2 and 3 is produced according to the invention as a single-piece component of plastic, and is constructed as an injection moulded body. It has a plate-shaped or respectively cubic base body 11, on the upper side of which laterally two plate-shaped holding brackets 13, 14 are arranged, aligned parallel to each other, which define a fastening region 15 of the adapter 10. In each of the two holding brackets 13, a first connection 16 is formed in the form of a connecting piece 17, which is able to be connected with a hose line, not illustrated, for the supplying of the washing fluid 5 from a washing medium storage container to the adapter 10. The first connection 16 has a blind bore 18, which opens out into a connecting channel 19. The connecting channel 19, proceeding from the upper side 21 of the holding brackets 13, 14 extends into the base body 11 and opens out there into a second connection 22. The second connection 22 is constructed as a through bore 23, which on the sides of the base body 11 facing away from each other has respectively a connecting piece 24, 25, via which for example the profile body 106 or respectively the spray channels 103, 104 can be connected with the adapter 10.

In the illustrated example embodiment, the first connections 16 and the second connections 22 run parallel to each other, and the connecting channel 19 is arranged perpendicularly to the two connections 16, 22. Of course, it is within the scope of the invention to provide a different geometric arrangement of the connecting channel 19 or respectively of the connections 16 and 22.

The end of the connecting channel 19 lying opposite the second connection 22 is sealed hydraulically by a closure member constructed as closure ball 26. Here, after the production of the adapter 10, the closure ball 26 is fixed in the connecting channel 19 by pressing into an opening region 27 on the upper side 21 of the respective holding bracket 13, 14.

The two holding brackets 13, 14 have respectively a transverse bore 28, which serves to receive a transverse bolt 29, which in turn is surrounded in the region between the two holding brackets 13, 14 by a sleeve 30 arranged so as to be rotatably movable to the transverse bolt 29. By means of the transverse bolt 29 or respectively the sleeve 30, the adapter 10 can be connected or respectively engaged in a form-fitting manner with a wiper rod 6, illustrated in FIG. 4, having a bow-shaped connecting region, which is a component of the wiper arm 2. Here in particular a spring part 7, arranged between the wiper rod 6 and the sleeve 30 and acting as an adapter piece, serves for the engaging of the wiper rod 6 or respectively of the wiper arm 2 with the adapter 10.

In FIGS. 4 and 5 an adapter 10a is illustrated which is modified compared with the adapter 10. The adapter 10a differs from the adapter 10 substantially in that the first connections 16a are not arranged in the holding brackets 13a, 14a, but rather in the region of the second connection 22a, here in particular in the region of the connecting piece 25a. Here, the arrangement of the connecting piece 17a is such that the latter is arranged obliquely to the connecting piece 25a. With such an arrangement, in which the first connection 16a is connected directly with the second connection 22a, the construction of a connecting channel 19 as in the adapter 10 can be dispensed with. This makes it possible in particular that no additional hydraulic closing of a connecting duct 19 by means of a closure member as with the adapter 10 is necessary.

In FIG. 5 furthermore a variant of the adapter 10a is illustrated, in which the latter is connected laterally with a wiper arm 2a.

In FIGS. 6 and 7 a third adapter 10b according to the invention is illustrated. The adapter 10b differs from the adapter 10a substantially in that the two first connecting pieces 16b are situated in an intermediate space 31 between the second connections 22b. The two first connections 16b are connected here via transverse channels 32, 33 with the second connections 22*b* or respectively the through bores 23*b* thereof. In FIG. 6 the case is illustrated in which the through bores 23*b* are closed hydraulically from the exterior via closure members constructed as closure balls 34.

In FIG. 7 the case is illustrated, in which a transverse channel 32 is closed by a closure ball 35, which closes the transverse channel 32 in the region of its discharging into the through bores 32 associated with it. Thereby, the adapter 10*b* can also be used for example for wiper blades 100 which only have spray channels 103, 104 or respectively nozzle openings 105 on a longitudinal side. On the right-hand side in the plane of the drawing in FIG. 7 on the other hand, the transverse channel 33 is closed by a nozzle body 37, which is constructed as ball and which has a through bore 38. The nozzle body 37 is arranged here so as to be displaceable, in order to make possible an aligning of the through bore 38, which discharges washing fluid 5 into the region of the adapter 10*b* onto the vehicle window.

Furthermore, the adapter 10*b* is surrounded in the region of its two holding brackets 13*b*, 14*b* by an adapter element 39 of U-shaped cross-section, which is connected with the wiper arm 2 and is arranged pivotably to the adapter 10*b*.

The adapters 10, 10*a*, 10*b* described so far can be altered or respectively modified in various ways, without departing from the idea of the invention. Also, further modifications to the wiper device 10, in particular to the wiper blade 100, are also conceivable or respectively possible, without departing from the idea of the invention.

LIST OF REFERENCE NUMBERS 1 wiper device
2,2*a* wiper arm
3 axis
4 double arrow
5 washing fluid
6 wiper rod
7 spring part
10,10*a*,10*b* adapter, wiper device
11 base body
13,13*a*,13*b* holding bracket
14,14*a*,14*b* holding bracket
15 fastening region
16,16*a*,16*b* first connection
17,17*a* connecting piece
18 blind bore
19 connecting channel
21 upper side
22,22*a*,22*b* second connection
23,23*b* through bore
24 connecting piece
25,25*a* connecting piece
26 closure ball
27 opening region
28 transverse bore
29 transverse bolt
30 sleeve
31 intermediate space
32 transverse channel
33 transverse channel
34 closure ball
35 closure ball
37 nozzle body
38 through bore
39 adapter element
100 wiper blade
101 wiper rubber
102 wiper lip
103 spray channel
104 spray channel
105 nozzle opening
106 profile body

The invention claimed is:

1. A wiper blade for the cleaning of windows of motor vehicles, comprising:

at least one spray channel, arranged on the wiper blade, with spray openings for the discharging of washing fluid onto the window;

at least one first connection for connecting the spray channel to an external hose line for the supply of the washing fluid; and at least one adapter for connecting the wiper blade to a wiper arm of a wiper device, wherein the at least one first connection is arranged on the adapter, and wherein the adapter is arranged hydraulically in operative connection with at least one second connection, likewise arranged on the adapter, which is connected with the spray channel, wherein the adapter further comprises a second first connection, wherein the adapter further comprises a second second connection, wherein the first connections are separated from the second connections hydraulically, wherein the second connections are connected with the spray channels' are respectively constructed as through bores, arranged parallel to each other, with two connecting pieces for the spray channels, respectively, wherein the adapter is constructed as a single-piece plastic injection moulded part, and comprises, in a fastening region, two holding brackets arranged parallel to each other spaced apart on the longitudinal sides of the adapter, wherein the two holding brackets are linked by a transverse bolt.

2. The wiper blade according to claim 1, wherein the first connections are arranged on a fastening region of the adapter, which runs above the second connections which are connected with the spray channel, and the first connections serve for fastening the adapter on the wiper arm, wherein the second connections are constructed as a through bore in the adapter element, which is connected via two connecting pieces with two spray channels, wherein a connecting channel is constructed in the adapter, which connects the first and second connections with each other hydraulically, wherein the connecting channel opens out in the through bores of the second connections and the first connections open out in the through bore, and wherein, on the side of the connecting channel facing away from the through bore, the connecting channel is sealed hydraulically by a closure member.

3. The wiper blade according to claim 2, wherein the closure member is a closure ball, which is pressed mechanically into the opening of the connecting channel arranged on the surface of the adapter.

4. The wiper blade according to claim 2, wherein the wiper arm has a wiper rod with a bow-shaped connecting section, which is connected with the adapter via a bolt arranged in the two holding brackets, wherein the connecting section engages into an intermediate space between the two holding brackets.

5. The wiper blade according to claim 2, wherein the wiper arm of the wiper device has an adapter element which is U-shaped in cross-section, the two arms of which are arranged parallel to each other, and overlap the two holding brackets from the exterior, wherein the adapter element is arranged pivotably to the holding brackets and is connected with the latter.

6. The wiper blade according to claim 1, wherein the first connections are constructed as a connecting piece, which opens directly into the second connections.

7. The wiper blade according to claim 6, wherein the discharging in of the first connections takes place in a region of the second connections which is constructed as a connecting piece.

8. The wiper blade according to claim 1, wherein the first connections are arranged in an intermediate space between the second connections and are connected hydraulically with the second connections via transverse channels.

9. The wiper blade according to claim 8, wherein the transverse channel is closed hydraulically in a tight manner on the side facing away from the first connection by means of a closure member, or carries an adjustable nozzle body, which forms a spray opening for the washing fluid.

* * * * *